Patented Jan. 12, 1943

2,308,069

UNITED STATES PATENT OFFICE 2,308,069

RESINOUS MELAMINE-ALDEHYDE CONDENSATION PRODUCT

Willi Fisch, Binningen, near Basel, Switzerland, assignor, by mesne assignments, to Ciba Products Corporation, Dover, Del.

No Drawing. Application May 16, 1939, Serial No. 274,057. In Switzerland May 21, 1938

9 Claims. (Cl. 260—72)

It is known that melamine (2:4:6-triamino-1:3:5-triazine) may be obtained by heating a solution of dicyandiamide in liquid ammonia for several hours at 100° C. (Franklin, J. Am. Chem. Soc., 44, 504/1927). The yield is however below 30 per cent even when the duration of the heating is 6 hours.

It has been proposed to conduct the reaction, starting with dicyandiamide or cyanamide, at a temperature above 100° C. In this case dicyandiamide for example dissolved in liquid ammonia may be converted at 160° C. almost quantitatively into melamine. The increase of the temperature of the reaction however involves an increase of the working pressure, for instance up to 200 atmospheres which requires costly and complicated apparatus.

The present invention relates to a process in which this disadvantageously high temperature and pressure is avoided and the yield none the less considerably increased and consists in conducting the reaction by heating the solution of dicyandiamide or cyanamide in liquid ammonia at a temperature not substantially above 100° C. viz. up to about 110° C. for at least 10 hours.

By solutions of dicyandiamide or cyanamide in liquid ammonia are to be understood solutions obtainable at room temperature; 1 part by weight of ammonia may under that condition dissolve about 1 part of dicyandiamide or at least 10 parts of cyanamide. By heating such a solution at about 100° C. the yields obtained exceed those obtainable by the process of Franklin 2-3-fold and the pressures produced are at first very low and in no case exceed about 70 atmospheres.

The result achieved by the present process was by no means to be foreseen since the said conversion leading at 160° C. uniformly to melamine as mentioned above, surprisingly yields at 100° C. by-products which themselves are no longer convertible into melamine. Thus a prolongation of the time of reaction could have favored either the formation of melamine or that of the by-products. The fact that, according to the present invention, the conversion takes its course to a large extent in favor of the melamine formation could therefore not be anticipated.

The nature of the by-products in question is for the greater part not as yet elucidated. Amongst these products there are for instance bodies which in acid solution are difficultly soluble and which both in ammoniacal and in acid solution form sparingly soluble silver salts.

The raw mixtures, as obtained in the present process, are however completely soluble in water, in contradistinction to those mixtures obtained according to the hitherto known manufacturing methods working within a similar pressure range or without using pressure. Furthermore, they are more easily soluble than a corresponding quantity of pure melamine.

There was further made the technically extremely valuable observation that the raw mixtures are capable of being used directly as such for certain purposes. Thus for instance they may be used without any purification for the condensation with aldehydes for instance formaldehyde to form resinous condensation products of the same quality as a corresponding quantity of pure melamine. This result is to be attributed to the nature of the by-product. Consequently the melamine obtainable according to the present process when used for the above mentioned purposes must not be isolated from its raw mixture. Thus according to the present invention there may be obtained under proportionally small pressures a material which up to now in the same quantity and quality could only be produced under very high pressures.

As example for the valuable properties of the raw mixtures there may be mentioned the following trial: 200 parts of the raw mixture obtained according to Example 1 hereinafter by a treatment for 48 hours at 100° C. are condensed with 480 parts of formaldehyde of 30 per cent strength in a weak alkaline solution on the boiling water bath for ½–1 hour, then kneaded with cellulose, dried and ground. The molding powder thus obtained shows in all its properties such as moldability, time of hardening, hardness and fastness to boiling of the molded parts the same outstanding qualities as products from pure melamine. The water absorptions corresponding to various hardening times and temperatures are for instance as follows:

| Molding temperature | Time of molding in minutes | 10 minutes in boiling water, increase in weight in per cent | 24 hours in water of room temperature, increase in weight in per cent |
|---|---|---|---|
| 145° C | 1½ | 0.98 | 0.21 |
| 145° C | 3 | 0.75 | 0.30 |
| 150° C | 1½ | 0.71 | 0.28 |
| 150° C | 3 | 0.53 | 0.35 |
| 150° C | 5 | 0.35 | 0.39 |
| 160° C | 1 | 0.23 | 0.28 |
| 160° C | 2 | 0.24 | 0.27 |

The following examples illustrate the invention, the parts being by weight:

Example 1

Equal parts of dicyandiamide and liquid ammonia are heated together in an autoclave at 100° C. After 18 hours the yield of melamine is 56 per cent, after 48 hours 71 per cent and after 96 hours 76 per cent.

Example 2

10 parts of cyanamide are dissolved in 3.6 parts of liquid ammonia and the solution is heated for 40 hours at 100° C. The yield of melamine is 77 per cent.

Example 3

A solution of 10 parts of cyanamide in 1.7 parts of liquid ammonia is heated for 10 hours at 107° C. The yield of melamine is 70 per cent.

Example 4

10 parts of cyanamide dissolved in 2.9 parts of liquid ammonia are heated for 80 hours at 95° C. The yield of melamine is 78 per cent.

Example 5

10 parts of cyanamide dissolved in 2.7 parts of liquid ammonia are treated for 80 hours at a temperature of 107° C. The yield of melamine amounts to 84 per cent.

What I claim is:

1. Process for the manufacture of resinous aldehyde condensation products containing melamine, wherein raw mixtures obtained by heating a liquid ammonia solution of a cyan derivative of the formula $(CN_2H_2)_x$, wherein $x$ means a whole number not greater than 2, at a temperature not substantially exceeding 100° C. for at least 10 hours are condensed with aldehydes.

2. Process for the manufacture of resinous aldehyde condensation products containing melamine, wherein raw mixtures obtained by heating a liquid ammonia solution of a cyan derivative of the formula $(CN_2H_2)_x$, wherein $x$ means a whole number not greater than 2, at a temperature up to about 110° C. for at least 10 hours are condensed with aldehydes.

3. Process for the manufacture of resinous aldehyde condensation products containing melamine, wherein raw mixtures obtained by heating a liquid ammonia solution of a cyan derivative of the formula $(CN_2H_2)_x$, wherein $x$ means a whole number not greater than 2, at a temperature not substantially exceeding 100° C. for at least 10 hours are condensed with formaldehyde.

4. Resinous melamine-aldehyde-containing condensation products resulting from the condensation with an aldehyde of the raw mixture obtained by heating a liquid ammonia solution of a cyan derivative of the formula $(CN_2H_2)_x$, wherein $x$ represents a low number not greater than 2, at a temperature not substantially exceeding 100° C. for at least ten hours.

5. Resinous melamine-aldehyde-containing condensation products resulting from the condensation with an aldehyde of the raw mixture obtained by heating a liquid ammonia solution of a cyan derivative of the formula $(CN_2H_2)_x$, wherein $x$ represents a low number not greater than 2, at a temperature up to about 110° C. for at least ten hours.

6. Resinous melamine-aldehyde-containing condensation products resulting from the condensation with a formaldehyde of the raw mixture obtained by heating a liquid ammonia solution of a cyan derivative of the formula $(CN_2H_2)_x$, wherein $x$ represents a low number not greater than 2, at a temperature not substantially exceeding 100° C. for at least ten hours.

7. A molding powder comprising, as binding agent, the resinous melamine-aldehyde-containing condensation products resulting from the condensation with an aldehyde of the raw mixture obtained by heating a liquid ammonia solution of a cyan derivative of the formula $(CN_2H_2)_x$, wherein $x$ represents a low number not greater than 2, at a temperature not substantially exceeding 100° C. for at least ten hours.

8. A molding powder comprising, as binding agent, the resinous melamine-aldehyde-containing condensation products resulting from the condensation with an aldehyde of the raw mixture obtained by heating a liquid ammonia solution of a cyan derivative of the formula $(CN_2H_2)_x$, wherein $x$ represents a low number not greater than 2, at a temperature up to about 110° C. for at least ten hours.

9. A molding powder comprising, as binding agent, the resinous melamine-aldehyde-containing condensation products resulting from the condensation with a formaldehyde of the raw mixture obtained by heating a liquid ammonia solution of a cyan derivative of the formula $(CN_2H_2)_x$, wherein $x$ represents a low number not greater than 2, at a temperature not substantially exceeding 100° C. for at least ten hours.

WILLI FISCH.